(12) United States Patent
Kraus (10) Patent No.: US 11,170,428 B2
(45) Date of Patent: Nov. 9, 2021

(54) METHOD FOR GENERATING PRIORITY DATA FOR PRODUCTS

(71) Applicant: Omikron Data Quality GmbH, Pforzheim (DE)

(72) Inventor: Carsten Kraus, Pforzheim (DE)

(73) Assignee: Omikron Data Quality GmbH, Pforzheim (DE)

( * ) Notice: Subject to any disclaimer, the term of this patent is extended or adjusted under 35 U.S.C. 154(b) by 322 days.

(21) Appl. No.: 15/569,816

(22) PCT Filed: Apr. 28, 2016

(86) PCT No.: PCT/EP2016/059498
§ 371 (c)(1),
(2) Date: Oct. 27, 2017

(87) PCT Pub. No.: WO2016/174142
PCT Pub. Date: Nov. 3, 2016

(65) Prior Publication Data
US 2018/0130116 A1 May 10, 2018

(30) Foreign Application Priority Data
Apr. 28, 2015 (EP) .................................. 15165337

(51) Int. Cl.
*G06Q 30/06* (2012.01)
*G06F 16/95* (2019.01)
*H04L 29/08* (2006.01)

(52) U.S. Cl.
CPC ......... *G06Q 30/0631* (2013.01); *G06F 16/95* (2019.01); *H04L 67/22* (2013.01)

(58) Field of Classification Search
CPC .......... G06Q 30/00-08; G06Q 30/0631; G06F 16/95; H04L 67/22
See application file for complete search history.

(56) References Cited

U.S. PATENT DOCUMENTS 9,606,621 B2 * 3/2017 Lashina .................. G06F 3/013
9,965,799 B2 * 5/2018 Schiffman .......... G06Q 30/0641
(Continued)

FOREIGN PATENT DOCUMENTS

CN           102870113 A      1/2013
WO    WO 2007/144199 A1    12/2007    ............. G06F 17/30
WO    WO 2012/025439 A1     3/2012    ............. G06F 17/30

OTHER PUBLICATIONS

Group and Single-user Influence Modeling for Personalized Recommendation. Kompan, Michal. Information Sciences and Technologies Bulletin of the ACM Slovakia, vol. 6, No. 2 (2014) 11-20 (Year: 2014).*

(Continued)

*Primary Examiner* — Michael Misiaszek
(74) *Attorney, Agent, or Firm* — Kusner & Jaffe (57) ABSTRACT

A method for producing priority data for products for which information can be output. A first time, data are stored for at least one product with which a defined user or a defined user device has interacted. At least one subset of the products is assigned priority data for an output of information to the defined user or to the defined user device for the products on the basis of the stored data. At a second time, a request for an output of information for the products by the defined user or the defined user device is captured. The output of information for the products in response to the request is effected on the basis of the stored priority data. A method for operating a web page for E-Commerce and a computer program product having program code for performing the method for producing priority data.

22 Claims, 3 Drawing Sheets

(56) References Cited

U.S. PATENT DOCUMENTS

| | | | | |
|---|---|---|---|---|
| 10,091,323 | B2* | 10/2018 | Schleier-Smith | G06Q 50/01 |
| 10,318,986 | B1* | 6/2019 | Southworth | G07F 9/026 |
| 10,325,285 | B1* | 6/2019 | Wai | G06Q 30/0255 |
| 10,496,660 | B1* | 12/2019 | Freund | G06F 16/248 |
| 2011/0055927 | A1* | 3/2011 | Hamilton, II | G06F 3/011 |
| | | | | 726/26 |
| 2011/0270850 | A1* | 11/2011 | Wana | H04L 67/02 |
| | | | | 707/749 |
| 2013/0275913 | A1* | 10/2013 | Moritz | G06F 3/0481 |
| | | | | 715/810 |
| 2014/0058833 | A1* | 2/2014 | Ouimet | G06Q 30/02 |
| | | | | 705/14.49 |

OTHER PUBLICATIONS

International Search Report (ISR) from corresponding International Patent Application No. PCT/EP2016/059498, dated Aug. 1, 2016 (including English language machine translation of the comments included in the ISR).

* cited by examiner

METHOD FOR GENERATING PRIORITY DATA FOR PRODUCTS

FIELD OF THE INVENTION

The present invention relates to a method for producing priority data for products for which information can be output. In the method, at a first time, data are stored for at least one product with which a defined user or a defined user device has interacted. At least one first subset of the products is assigned priority data for an output of information to the defined user or to the defined user device for the products on the basis of the stored data. At a second time, a request for an output of information for the products by the defined user or the defined user device is captured. The output of information for the products in response to the request is then effected on the basis of the stored priority data. The method is performed particularly on a computer-aided or computer-implemented basis. The invention moreover relates to a method for operating a web page for E-Commerce, in which this method is used to produce priority data for at least one first subset of the products, and to a computer program product having program code for performing the method according to the invention.

BACKGROUND OF THE INVENTION

In E-Commerce, a multiplicity of products is offered by means of a web page. A user calling the web page is able not only to search for these products and obtain information for the products on the web page, but also to purchase these products by means of the web page. In order to make it as convenient and easy as possible for the user to search for products, data of the user are stored when the web page is called. These user data are used when the web page is called afresh by this user, in order to match the information presentation and the search of the user for particular products to the needs of the respective user. By way of example, the most recently viewed products that the user has then not purchased, however, are stored. When a user then calls the web page afresh, these most recently viewed products are displayed to him on the home page in order to increase the probability of his purchasing these products when the web page is called afresh.

It has been found that this method for presenting product information yields good results for E-Commerce web pages that are usually called by the users very frequently. The products presented afresh to the user are purchased by this user more frequently than other products. In the case of E-Commerce web pages that are usually not visited as frequently by a user, however, it has been found that this method does not yield the same advantageous results.

The output of information via an E-Commerce web page is effected generally by means of priority data that are assigned to the products. If the value of the priority data for a particular product is high, information for this product is displayed on the home page or for a search more frequently, more prominently or further up in a list than a product having a lower value for the associated priority data. The priority data should therefore be produced such that they reflect the relevance of the associated product for a specific client computer or a particular user as well as possible.

SUMMARY OF THE INVENTION

The present invention is therefore based on the technical problem of specifying a method for producing priority data for products of the type such as at the outset that produces the priority data such that they map the relevance of the assigned products for a particular client computer or a defined user as accurately as possible.

According to the invention, this technical problem is solved by a method having the features of the independent claim(s). Advantageous configurations and developments emerge from the dependent claims.

The method according to the invention is therefore characterized in that at least in a time interval portion between the first and second times, features of product interactions are captured that have been generated during an interaction by another user or another user device of the other user with the products of the first subset of the products. The stored priority data of the first subset of the products are then altered on the basis of the respective captured features of the product interactions.

The term "products" within the context of the invention denotes particularly objects that are offered to the user by a supplier, particularly goods and services. These may be physical objects, for example, or, by way of example, files, for example music or video files, texts and images or web pages. In this specification, a product can furthermore also be understood to mean a product category or a group of single products having particular properties.

According to the invention, an interaction of the defined user with at least one product is first of all captured. On the basis thereof, a first subset of the products is assigned priority data. In this case, this first subset can comprise merely the product with which the user has interacted, for example. It can further comprise products that are related to one another, for example, in the same category, for example. Further, the subset may also be identical to the complete set of the products. In particular, the interaction of the user with the product influences the priority data of other products or of a defined set of products.

In the method according to the invention, the priority data of a product are therefore also dependent on features of the product interactions that have been generated in the event of interactions with the products by another user in the time interval between a product interaction and a request for an output of information by the defined user. In this way, the user behavior of another user influences the priority of a product for the defined user, that is to say that product interactions both by the defined user and by other users are taken into consideration. In particular, the increasing or decreasing interest of other users in the products over the course of time is taken into consideration in this case. The priority data and the output, dependent thereon, of information for the products are adapted accordingly. This allows the relevance of a product to the defined user to be ascertained better, which means that the defined user can be presented with products that are more relevant to him when the information is output.

The product interactions are physical product interactions, in particular. These product interactions and/or the features thereof are captured particularly by means of a capture unit, particularly a device for data capture. In the event of a product interaction, e.g. a data transmission is therefore effected that is captured by the capture unit.

The data that are stored in the inventive method for products with which an interaction has taken place comprise particularly information about which user or which user device has interacted with this product. The priority data are stored for the later output of information to the same user or the same user device. According to the invention, however, they are influenced by the user behavior of other users.

In one configuration of the method according to the invention, a server is used to capture a call to a web page by another user or another user device of the other user. In the process, the features of the product interactions in the time interval portion between the first and second times are captured.

According to one configuration of the method according to the invention, at the first time, data are stored for products for which the interaction has involved information being output in the event of a call to a web page by a client computer of the defined user or by the defined user. The first subset of the products is assigned, on the basis of the stored data, the priority data for a fresh call to the web page by this client computer or by this user. At the second time, the request for the information output is a fresh call to the web page by this client computer or by this user. The output of information for the products in the event of the fresh call to the web page is then effected on the basis of the stored priority data. The first time is, in this configuration, the call and the second time is the fresh call to the web page by the client computer or by the defined user.

Advantageously, in this configuration, the priority data for the later call to the web page by a defined client computer or by a defined user are influenced by the user behavior when the web page is called by another user or another user device of the other user or another interaction by another user or another user device of the other user with the products. The product interactions of the defined user thus take place virtually on the web page, those of the other user also via a web page or in a different way, as explained later. In this case, in a broader sense, a call or visit to the web page is understood to mean computer-implemented methods for requesting information and outputting said information for a user. The method is thus not restricted to the output of a web page in a browser, but rather also comprises the output of data by means of a suitable application, for example on a mobile phone or mobile computer, or, by way of example, by a terminal in a store and also the sending of an E-mail.

The alteration of the priority data by the user behavior of the other users advantageously results in the defined user being able to have information output to him for products that are as relevant as possible to him. Furthermore, it is possible to store information about which routine has involved information for the product being output during a visit to the web page. By way of example, it is possible to store that the user has placed the product into an electronic shopping basket but has then still not purchased the product. Equally, it is possible to store if the user has noted the product on an electronic wish list. Finally, it is possible to store whether the user has obtained further information for the product on the web page, for example by calling a detailed product description. These data can also influence the value of the priority data for the assigned product, i.e. the priority of the product for the applicable user or the associated client computer.

The product interactions and/or the features thereof are captured particularly by means of a sensor. Since the priority data that influence the output of information for the products in response to an applicable request are dependent on the captured product interactions or the features thereof, the method according to the invention involves the output of the information being produced on the basis of measurement signals from a sensor. In particular, a physical interaction of a user or of a user device with a product is captured by means of the sensor and the measurement signals produced in the process are processed such that features of the product interaction are produced.

According to one form, the product interactions involve a physical proximity between the products and the user and/or the user device being captured. It is thus advantageously possible for physical product interactions to be captured, for example in a store or showrooms. By way of example, the position of the user can be captured, for example by means of a camera or a tracking system that locates the user on the basis of his user device. In this case, the user may be the defined user and/or the other user, the user device further being able to be the user device of the defined user and/or the user device of the other user. In this way, it is possible to establish, by way of example, whether the user is in proximity to the product, for example in front of a particular shelf.

The features of the product interactions are then dependent particularly on the captured physical proximity between the products and the user and/or the user device.

Features of the product interaction beyond the mere detection of the physical proximity can likewise be captured, for example if the user takes a product from a shelf or places it into a shopping cart. In addition, it is possible, by way of example, for a capture system to detect that the user views a product specifically. Further, it is possible to infer the physical proximity and a physical interaction indirectly, for example when the user pays for a product at a checkout facility. Further, it is possible to capture when a user purchases a product and later returns or exchanges it.

In this case, a product interaction by the defined user or another user, or the applicable user devices, can be captured. By way of example, it is also possible to capture product interactions by unidentified users, for example the frequency of a particular type of interaction, for example how often the product is taken from the shelf or purchased. Further, the user can identify himself, for example by log in data from his user device, during a cashless payment process or by a customer card.

By way of example, a camera system or a set of data goggles of the user can be used to capture the physical position of the user relative to the physical position of the products. The features of the product interactions are then dependent on the captured relative position of the user in relation to the products. Further, a corporal interaction of the user with the products can be captured. The features of the product interactions are then dependent on the captured corporal interaction of the user with one of the products. Furthermore, a code of one of the products can be captured by means of an electronic checkout system. The features of the product interactions are then dependent on the captured code of one of the products.

In one development, the product interactions involve signals being transmitted between the products and the user device by means of at least one transponder. This advantageously allows the detection of a physical interaction by the user. In this case, radio-based systems with limited range can detect whether the user is in physical proximity to products. In this case too, product interactions by the defined user or another user can be captured. In particular, signals can be transmitted by RFID ("radio frequency identification") or NFC ("near field communication"), for example.

By way of example, a product can comprise, particularly on its packaging, a transponder from which the mobile user device of the user, for example, can read signals and identify the product. Conversely, the position of the user can be captured using a transponder, for example in his customer card or on his shopping cart. Furthermore, both the product and the user can be identified using transponders, for example by a suitable reading device at a particular position in a showroom, on a shopping cart or at a checkout facility. The features of the product interaction captured in this manner can comprise the identification of the product, the transmitted signal and the time and location of the transmission, for example.

In particular, the captured product interactions can comprise both physical and virtual interactions. By way of example, both the behavior of users of a web page and the behavior of users in a store can be used to determine or alter the priority data of the products. By way of example, the priority of products on the web page may be dependent on how often the product is currently purchased in the store. This advantageously allows the relevance of the products to the user to be determined more accurately.

According to one configuration of the method according to the invention, in addition to the capture of the feature of the product interaction for a product, the time of generation of the feature of the product interaction is stored. The alteration of the stored priority data of the products is then further dependent on the time of generation of the respective feature of the product interaction. Alternatively or additionally, the time of the output of information for the product can also be stored for another user or by another user device and alter the priority data. By way of example, the features of product interactions can be weighted differently in relation to the influence of the features on the alteration of the priority data on the basis of the time associated with the capture of the feature. The features of such product interactions as are at a time closer to the request for an output of information for the products by the defined user or the defined user device can be weighted e.g. more strongly. Conversely, it is also possible for features of such product interactions as are at a time closer to the request for an output of information for the products by the defined user or the defined user device to be weighted e.g. more weakly. If, by way of example, a forerunner is interested in a product, this product does not become more attractive to this forerunner as a result of many other users now purchasing it. These scenarios can be taken into consideration flexibly in the method according to the invention by virtue of the weightings of the features of the product interactions.

According to one development of the method according to the invention, such features of product interactions as have been generated later are weighted more strongly than features of product interactions that have been generated at an earlier time.

In the case of features of product interactions that are subject to a variation over time, this allows the relevance of a product to the user to be reflected better when the web page is called afresh, so that the user can advantageously have product information output to him that is particularly relevant to him. The features of product interactions that are subject to variations over time relate to products having properties that are subject to seasonal variations, for example. By way of example, there are products that are particularly relevant to the wintertime, and other products are particularly relevant in summertime. Storage of the time of generation of the feature of the product interaction, for example when the web page is called by another user, allows such seasonal variations to be taken into consideration, for example.

According to one configuration of the method according to the invention, the features of the product interactions for the products comprise the frequency of the interaction with these products by the other user or the other user device. In this case, particularly the value of the priority data of the product rises if the product interaction, for example the output of information for this product when the web page is called by the other client computer or by the other user, was effected frequently.

These measures allow the trend in the interest in a product in the time interval portion, particularly between two calls to the web page by the defined user, to be taken into consideration. If the user has obtained information for a particular product during a visit to the web page, for example, and the interest in this product subsequently rose sharply in other users when visiting the web page, then the method according to the invention involves this increased interest of other users, which is accompanied by an output of information for this product or by a purchase of this product, for example, being taken into consideration in the priority data of the product for the defined user, so that the relevance of this product to the defined user is also increased. Conversely, it is possible to take into consideration when the interest of other users in this product has since declined, for example in the event of a seasonal decline in interest in winter sports equipment in summer.

In one development, the features of the product interactions for the products comprise the frequency of a purchase process for these products in the event of interactions by the other user or the other user device, for example when the web page is called by the other client computer or by the other user. The value of the priority data of the product then rises particularly sharply if the product has been frequently purchased by the other user or by his user device.

The output of information for the products comprises particularly the display of a depiction or description of the product. This depiction or description of the product may particularly be part of a list containing products. If a list containing information for products is displayed, said list has particularly a ranking or a particular order. In this case, the priority data of a product determine particularly the ranking of a product within the list.

According to one configuration of the method according to the invention, the ranking or order of the output of information for the products immediately after the request for an output of information by the defined user or the defined user device is dependent on the stored priority data for the products. By way of example, when the web page is called, particularly what is known as a home page is displayed, which comprises a list containing product information. The ranking of this list is in this case determined particularly by the priority data of the products, so the priority data that have a higher value are displayed on a higher rank in the list. By way of example, information for products having a higher priority can be depicted further up in the list or prominently.

According to one development, the method involves a search query for searching for products being received. A relevance rating in regard to the relevance of the respective product to the search query is then performed for the product data stored for the products. A hits list for the products is then produced for the output of the information for at least one second subset of the products, in the case of which hits list the ranking of the products is dependent on the relevance rating and on the priority data.

The output of information for the products is effected according to the invention on the basis of the stored priority values. Further, the information output arises from the applicable request by the user or the user device. By way of example, this may be a specified interest of the user, for example a search query, for which a relevance rating of the products is performed initially independently of the individual user or the product interactions. To respond to the specified interest, a relevance rating is performed, for example by means of the search terms. The relevance rating can take into consideration how many words of the search query are included in the description text for a product, for example, or how quickly the respective product can be delivered.

Methods for rating the relevance of search results that can be used according to the invention are, by way of example, methods as described in WO 2007/144199 A1 or WO 2012/025439 A1, the content of which is hereby incorporated into the present specification by way of reference.

The priority values that result from past product interactions of the defined user with the products can be used to clarify this relevance determination. In particular, this can involve personalization of the results being effected, for example if the past product interactions of the user are taken into consideration. In particular, it is further possible for further information about the user, for example the data of a user profile on a web page, to be used for the rating. For example, the age, sex or place of residence of the user can be used for the rating.

According to the invention, the priority values are now adapted on the basis of the product interactions of other users. In particular, this allows time-dependent adaptation to be performed, for example for an interest in a product that increases and decreases in particular periods.

If the information is output without an interest specified by the user, for example when an advertising letter is sent, when the home page of an internet shop is displayed or in an internet journal, the relevance determination on the basis of a search query is dispensed with and the priorities are ascertained on the basis of the past product interactions of the user and/or of the other users, for example.

In this case, the hits list generated for a conventional search query is thus dependent not only on the relevance rating for the search query but also on the priority data, i.e. on features generated in the meantime for product interactions by another user or another user device. This allows the hits list for the search query of the defined user to be advantageously improved.

In developments of the invention, still further parameters are involved in producing the priority data. By way of example, further data associated with the products can be stored. The stored priority data of the products are then further dependent on these further data. The further data may be a current profit margin for a product and/or the current availability of the product, for example.

In one development of the method according to the invention, further a measure of similarity for the products is determined for the at least one product. The priority data of the first subset of the products are then further produced or altered on the basis of the measure of similarity for the products with which a user or a user device has interacted. In this case, the user is the defined user and/or the other user, and further the user device is the user device of the defined user and/or the user device of the other user.

The similarity of the products is determined particularly using character strings that denote the products. In this case, the similarity of character strings is examined. The similarity of two character strings is understood to mean a total value formed from the values of their nonoverlapping fragments, preferably the sum of the adapted values of their nonoverlapping fragments, preferably divided by the total weight. When the similarity of two character strings is understood in this manner, the determining of the similarity of two character strings can be regarded mathematically as a set packing problem (weighted set packing problem) that involves searching a limited set for subsets that do not yet overlap. In particular, the determining of the similarity of two character strings can then be regarded mathematically as a solution to a weighted set packing problem that involves finding a selection of nonoverlapping subsets having the greatest total weight from a limited set. Applied to the determination of the similarity of two character strings, this means that the weighted set packing problem involves finding a selection of nonoverlapping fragments that, overall, result in a best possible value count for the similarity of the two character strings from the set of the fragments that can be formed with the two character strings.

It is thus advantageously possible for the influence of an interaction with a product on the priority data of other products to be dependent on a weighting in accordance with their similarity. In particular, this allows "related" products that have a greater similarity to be influenced more greatly than less similar products. The similarity of the products can be determined from the affiliation to the same category or by way of shared keywords, for example. Further, the products can have like or similar properties, for example color or price. In addition, the similarity of the products to one another can also be determined using further, inherently known methods, for example a recommendation service ("recommendation engine") or a neural network, in which case the commonalities must not be attributable to explicit properties of the products.

The invention moreover relates to a method for operating a web page for E-Commerce, in which an interaction with at least one product by a defined user or a defined user device is captured. Data for the product for which an interaction has been captured are then stored. Priority data are then produced for at least one subset of the products, as has been described above. A call to the web page by this user or his user device is then captured and information for the products is output on the basis of the stored priority data.

In one form, the interaction with the at least one product is a call to the web page that involves information being output for the product, particularly a display of a depiction and/or description of the product.

In one development of this method, the call to the web page involves a client computer identification being transmitted and the transmitted client computer identification is used to determine whether the web page has been called by the client computer or another client computer. Equally, it is possible for the call to the web page to involve a user identification being performed and the user identification is used to determine whether the web page has been called by the user or another user.

In another form, the interaction with the products is a physical proximity between the products and the user and/or the user device as has been explained above.

The invention moreover relates to a computer program product having program code for performing the method according to the method described above when the program code is executed by a computer.

BRIEF DESCRIPTION OF THE DRAWINGS

The invention is now explained on the basis of exemplary embodiments with reference to the drawings.

DETAILED DESCRIPTION OF THE INVENTION

Figure 1:
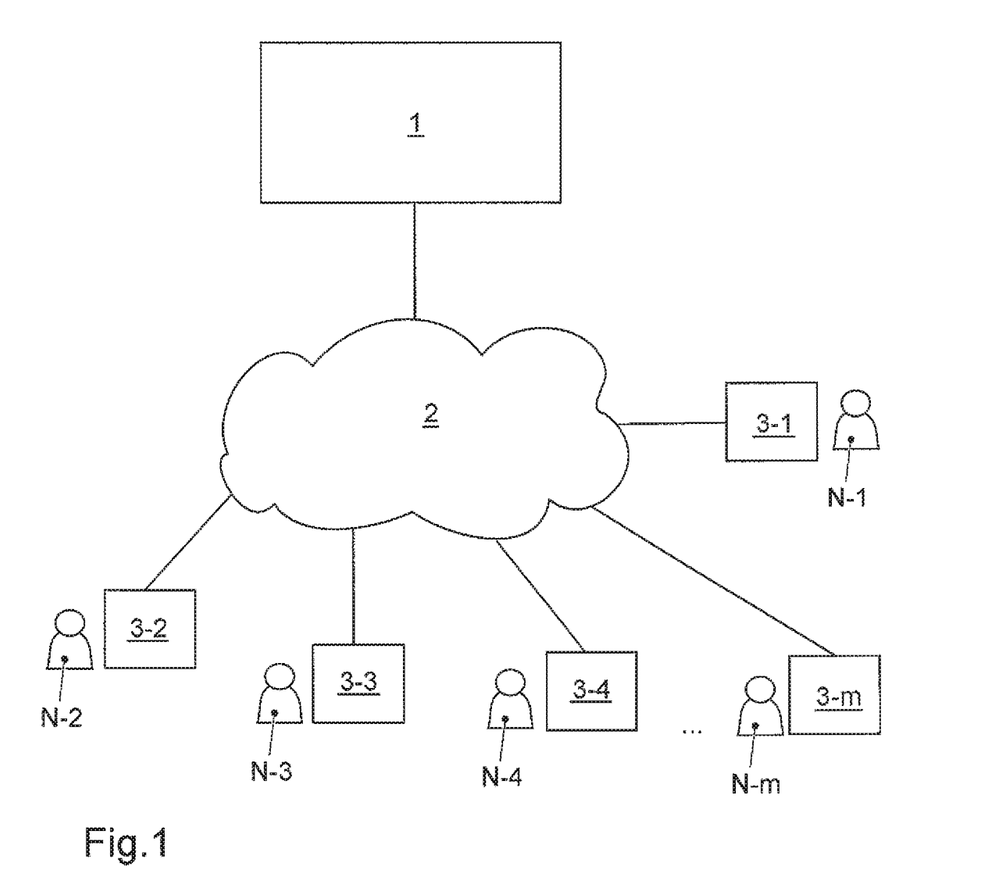
FIG. 1 shows the basic design of a system for implementing the exemplary embodiment of the method according to the invention.
Figure 2:
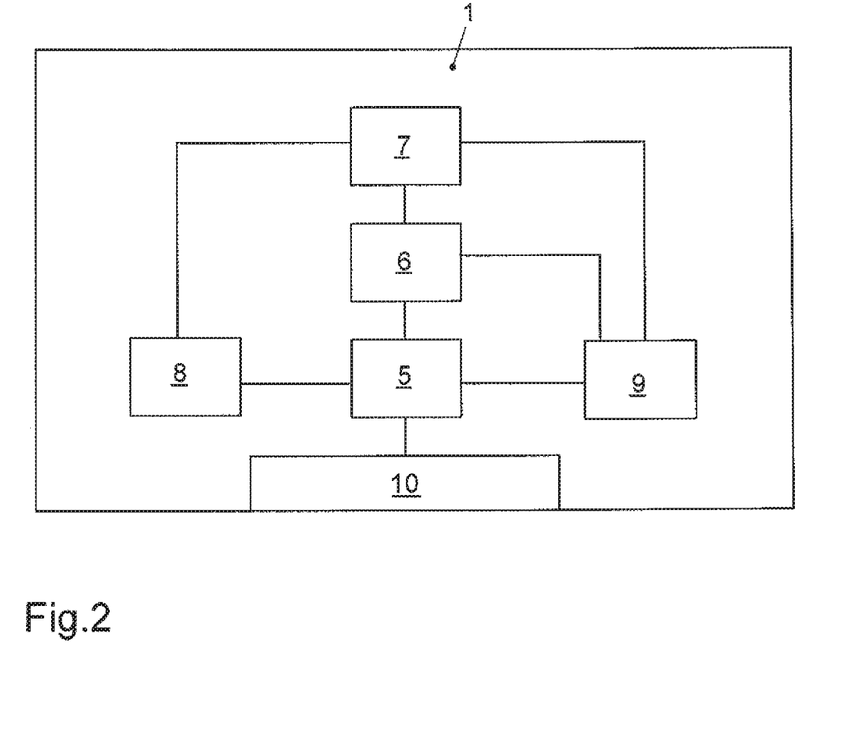
FIG. 2 shows the design of a server on which software is stored that can be used to implement the exemplary embodiment of the method according to the invention.

Referring to FIGS. 1 and 2, the basic design of a system for implementing the exemplary embodiment of the method according to the invention is first explained:

A server 1 has a piece of software or a program code stored on it for carrying out an E-Commerce method. The server 1 is connected to the Internet 2 or to another suitable network. Equally, a user device 3-1, in this case a client computer 3-1, of a defined user N-1 is connected to the Internet 2. Further, further user devices 3-2, 3-3, 3-4, . . . , 3-m, in the case illustrated client computers 3-2, 3-3, 3-4, . . . , 3-m, of the users N-2 to N-m are connected to the Internet 2. In a manner that is known per se, the users N-1 to N-m can use the client computers 3-1 to 3-m to access the server 1 via the Internet 2 and call a web page produced by the server 1 and in this manner display information on the client computers 3-1 to 3-m. In this context, a web page is understood to mean the internet presence of the E-Commerce provider. The web page can therefore comprise multiple subsidiary web pages.

The server 1 comprises a central control unit 5 that is coupled to a graphics unit 6. The graphics unit 6 produces displays for the web page. The content of the display is prescribed by the central control unit 5. To produce the displays, the graphics unit 6 accesses a database 7. The database 7 comprises particularly data from a multiplicity of products P-1 to P-n. The product data comprise particularly depictions and descriptions of the products P-1 to P-n. However, still further metadata are stored for the products P-1 to P-n, as is explained later.

The server 1 moreover comprises a search engine 8. The search engine 8 responds to search querys by producing a hits list showing, in a ranking, information for products P-1 to P-n that are stored in the database 7.

The control unit 5 is connected to a bidirectional interface 10 via which the server 1 is coupled to the Internet 2. Via the interface 2, the server 1 can transmit data for displaying the web page to the client computers 3-1 to 3-m. Further, inputs that have been made by means of the client computers 3-1 to 3-m can be transmitted to the server 1 via the Internet 2.

Moreover, the server 1 comprises a capture unit 9. The capture unit 9 is used when the web page is called by the client computer 3-1 or by a defined user N-1 to store data for products P-1 to P-n for which information has been output, particularly displayed, when the web page is called. The user N-1 thus interacts with the products P-1 to P-n by having information for them output. These data are stored as metadata for the products P-1 to P-n in the database 7. Moreover, the capture unit 9 is used to capture features of product interactions that are generated when the web page is called by another client computer 3-2 to 3-m or by another user N-2 to N-m. The capture unit 9 is therefore used to perform an identification of another client computer 3-2 to 3-m and/or of another user N-2 to N-m. These features of product interactions are also stored as metadata for the products P-1 to P-n in the database 7. Which features of product interactions are captured by the capture unit 9 is explained later with reference to the exemplary embodiment of the method according to the invention.

The database 7 includes priority data for the products P-1 to P-n as further metadata, which priority data include priority values for different users. These priority data can be altered by the different devices of the server 1, particularly by the central control unit 5, the search engine 8 and the capture unit 9. Details of how these priority data are produced and altered are explained later with reference to the exemplary embodiment of the method according to the invention.

An exemplary embodiment for operating a web page for E-Commerce by means of the server 1 is described below, which exemplary embodiment comprises an exemplary embodiment for producing priority data for products P-1 to P-n:

The starting point for the method is that the database 7 stores information for a multiplicity of products P-1 to P-n. For each product P-1 to P-n, a depiction and a description of the product is included, for example. Moreover, attributes are stored for the product and also metadata, which include priority data for particular users or client computers.

A browser of the client computer 3-1 is used by the user N-1 to call the web page of the server 1. When the web page is called, a client computer identification is transmitted to the server 1, which stores it in the database 7. At the same time, the time at which the web page is called is stored by this client computer 3-1. Moreover, when the web page is called, an identification of the user N-1 is performed. By way of example, the user N-1 uses a password to log in. The time at which this user N-1 logs in is also stored in the database 7.

Subsequently, the user N-1 uses the client computer 3-1 to retrieve information from the server 1 in a manner that is known per se and thereby interacts with the products P-1 to P-n for which he retrieves information, for example. By way of example, he can perform a search for different products P-1 to P-n of the E-Commerce provider. The search engine 8, the graphics unit 6 and the central control unit 5 are used to display to the user N-1 a hits list, for example, that comprises information for the different products P-1 to P-n of the E-Commerce provider in a particular ranking. The database 7 is used during the visit to the web page to store metadata for products P-1 to P-n that comprise particularly the information regarding which products P-1 to P-n the user N-1 has interacted with. Such features of the product interactions include which products P-1 to P-n have had information output for them, which products P-1 to P-n the user N-1 has placed into an electronic shopping basket or has added to an electronic wish list and which products P-1 to P-n the user N-1 has purchased, for example.

When the user N-1 leaves the web page again, for example by logging out or by virtue of the browser of the client computer 3-1 being closed, the data captured during the visit to the web page are taken as a basis for producing priority data for the products P-1 to P-n and for this user N-1 and said priority data are stored in the database 7. In particular, priority data for a subset of the complete set of the products P-1 to P-n are produced. This subset can comprise precisely the products P-1 to P-n with which the user N-1 has interacted. However, in another example, they can also include further products P-1 to P-n that belong to the same category as, for example, or have similar properties to the products P-1 to P-n with which the user N-1 has interacted. Further, this subset can be determined by virtue of a measure of similarity determining the similarity of the individual products P-1 to P-n relative to the products P-1 to P-n with which the user N-1 has interacted. This can also be accomplished by using a neural network that determines similarity between products P-1 to P-n without these necessarily needing to have similar properties. As methods for determining the measure of similarity, it is further possible to use methods as are described in WO 2007/144199 A1 or WO 2012/025439 A1.

By way of example, products P-1 to P-n for which information has been displayed to the user N-1 are assigned a first priority value, products P-1 to P-n that the user N-1 has added to the electronic wish list are assigned a second, higher priority value, and products P-1 to P-n that the user N-1 has placed into the electronic shopping basket but has not purchased are assigned a third, even higher priority value. In this case, the subset comprises merely the products P-1 to P-n with which the user N-1 has interacted.

In another example, if the user N-1 has placed a first product P-1 to P-n into the electronic shopping basket, other products P-1 to P-n are also assigned a high priority value. In this case, the other products P-1 to P-n are similar to the first product P-1 to P-n, for example the same model of a product P-1 to P-n in a different color, in a different material or a similar product P-1 to P-n from a different manufacturer.

These priority data are used, in the event of a fresh call to the web page by the client computer 3-1 from which the client computer identification has been stored, or by the user N-1 who has been ascertained on the basis of the user identification, in order to display information for these products P-1 to P-n on the home page of the web page, for example.

If the user N-1 uses the client computer 3-1 to call the web page afresh, for example, this is captured by the server 1 by means of the client computer identification or by means of the user identification. The central control unit 5 then retrieves from the database 7 the priority data stored for this user N-1 or this client computer 3-1 for particular products P-1 to P-n and uses the graphics unit 6 to produce a home page that includes a list containing information for products P-1 to P-n. The ranking of the products P-1 to P-n in this list is geared to the priority data in this case. The highest rank can be used to display, by way of example, information for the products P-1 to P-n that the user N-1 has admittedly placed into the electronic shopping basket but has not purchased when the web page was last called. The next lowest rank is used to display information for the products P-1 to P-n that the user N-1 has added to a wish list. An even lower rank is used to display information for the products P-1 to P-n that have only been displayed to the user N-1 when the web page was last called. Analogously, the rank of different products P-1 to P-n can be used to produce an advertising E-mail to the user N-1, for example, in order to output information for the products P-1 to P-n in this way. A common aspect of these situations is that information is output to the user N-1 without his having specified the desired information, for example by way of a search query. By way of example, the call to the web page whose home page has the list containing information for products P-1 to P-n corresponds to an unspecific information request of this kind.

If, in a further exemplary embodiment, the user N-1 prescribes further relevance criteria, for example by using search terms to start a search query, then the priority data for the products P-1 to P-n are also augmented by the relevance rating, which is formed independently of the user N-1. By way of example, the user searches for the term "coat". In response to this, a search is first of all performed for such products as correspond to the search term, and these products are ordered in accordance with their relevance. Further, the priority data for the products are used to alter the ranking of the products, for example if the user N-1 has already added a coat to his wish list at an earlier time. Further, the interactions of other users N-2 to N-m are taken into consideration and, by way of example, a coat of high rank that is currently purchased particularly frequently is displayed.

In the example described above, virtual product interactions take place on a web page, for example as a result of the calling of information for a product P-1 to P-n, the addition to a wish list or a purchase process. Analogously, information for the products can be output in other ways, for example by way of an advertisement, a brochure or an E-mail. The product interactions that can then be evaluated are, by way of example, that the user N-1 receives an E-mail containing information for a product P-1 to P-n, calls said information and/or uses a link in the E-mail to call further information for a particular product P-1 to P-n.

An exemplary embodiment for capturing physical product interactions by means of the server 1 is described below, which exemplary embodiment comprises a further exemplary embodiment for producing priority data for products P-1 to P-n:

As in the case described above, the starting point for the method in this case too is that the database 7 stores information for a multiplicity of products P-1 to P-n. By way of example, each product P-1 to P-n has metadata stored for it that include priority data for particular users N-1 to N-m or client computers 3-1 to 3-m.

The products P-1 to P-n are on a shelf in the showrooms and sales rooms of a store. The packaging of the products P-1 to P-n has transponders fitted to it, for example RFID or NFC transponders, for which the identification of the individual products P-1 to P-n can be read by a suitable reader. The user N-1 moves through the store, carrying a user device 3-1, for example a mobile phone 3-1, that comprises a device for reading the transponders. If the user N-1 stands in front of the shelf on which the product P-1 to P-n is located, an application that is installed on the mobile phone 3-1 and is executed can detect the physical proximity to the product P-1 to P-n (or to the RFID transponder) and transmit the features of this product interaction to the server 1. In this case, the use of the mobile phone 3-1 allows an identification of the user N-1, for example by virtue of the transmission of login data to the server 1. By way of example, it is possible to capture when and for how long the user N-1 stays with the product P-1 to P-n. Further, it is possible for further product interactions to be captured, for example whether the user N-1 takes the product P-1 to P-n from the shelf, whether he has further information for the product P-1 to P-n displayed, for example by means of the mobile phone 3-1, or whether he places the product P-1 to P-n into his shopping cart. Further, it is possible to capture when the user N-1 purchases the product P-1 to P-n and pays for it at the checkout facility of the store.

When transponders are used for detecting the product interaction, the transponder may be fitted to the product P-1 to P-n, particularly to its packaging, but it is also possible for the user N-1 to carry a transponder, for example in the form of a suitable user device 3-1 or of a transponder in a customer or credit card or on a shopping cart. A transponder of this kind associated with the user N-1 can be read by devices in the business premises, for example, in order to capture the position of the user, for example in front of the shelf with the product P-1 to P-n, or his interactions with products P-1 to P-n.

The product interactions can also be captured by other devices, for example by a camera system or a set of data goggles of the user N-1, which capture where the user N-1 is located, whether the user N-1 takes a product P-1 to P-n from the shelf, places it into the shopping cart or purchases it, for example. Such a system can also identify the user N-1 or capture which products P-1 to P-n the user N-1 viewed. The camera system may be fitted in the store, for example, or mobile, for example as a camera of a set of data goggles of the user N-1. Further, the checkout facility can capture purchase processes as product interactions and transmit them to the server 1.

On the basis of the data captured during the visit to the store and transmitted to the server 1, priority data are produced for the products P-1 to P-n and for the user N-1 and stored in the database 7. By way of example, products P-1 to P-n that the user N-1 has taken from the shelf are assigned a first priority value, products for which the user N-1 has called additional information are assigned a second, higher priority value, and products P-1 to P-n that the user N-1 has placed into the shopping cart but has ultimately not purchased are assigned a third, even higher priority value. Analogously, it is also possible for product interactions of other users N-2 to N-m to be evaluated, for example a high frequency of purchase processes can be assigned a particular priority value.

As already described above for virtual interactions, it is also possible for priority data to be altered for products P-1 to P-n other than just those with which the user N-1 has interacted. By way of example, the priority data of products P-1 to P-n can be altered on the basis of the features of interactions with similar products. By way of example, a frequent purchase of winter coats can also raise the priority data of other products P-1 to P-n from the "winter clothing" category.

If the user N-1 now calls the web page of the store, for example, these priority data are used to display information for these products P-1 to P-n on the home page of the web page, for example. In this case, the information for the products P-1 to P-n is output analogously to the method described above, wherein the ranking of the products P-1 to P-n in the displayed list is also geared to the priority data that have been determined from the data about the physical product interactions. The highest ranking can be used to display information for the products P-1 to P-n that the user N-1 has admittedly placed into the shopping cart but has not purchased when the web page was last called, for example.

Analogously to the calling of a web page, information for the products P-1 to P-n can also be displayed to the user N-1 in the physical space, for example the store. By way of example, a display device in the store detects that the user N-1 is in front of it. On the basis of the priority data of the products P-1 to P-n, information relevant to the user is then displayed to the user. By way of example, it is also possible for an adviser to identify the user N-1 and retrieve information about him, information concerning which products P-1 to P-n are particularly relevant to the user N-1. In this case, the user N-1 is provided with the information by way of the conversation with the adviser.

In a further exemplary embodiment, the user N-1 interacts with the products P-1 to P-n during a conversation: by way of example, the user N-1 can be presented with a product P-1 to P-n, for example as part of an advisory conversation or a telephone call. The forwarding of information to the user by mouth in this case corresponds to the display of information for the product P-1 to P-n on a web page. In this case, the interest of the user N-1 in the presented product P-1 to P-n can be captured, for example. Further, it is possible to capture whether the user N-1 asks for information for a particular product P-1 to P-n, for example, or purchases a product P-1 to P-n.

In a further exemplary embodiment, both physical product interactions, for example in a store, and virtual product interactions, for example on a web page, are captured and contribute to determining the priority data.

The product interactions described above, for example in a store, can analogously also be captured for other users N-2 to N-m and transmitted to the server 1. In this case, the product information can also be captured without an identification of the individual user. By way of example, the frequency of a purchase process can also be determined if the identity of the individual purchasers is unknown.

There follow an explanation of how the priority data are altered in the interval of time between a product interaction of the user N-1 or of the user device 3 and a request for an output of information for the products P-1 to P-n. In the example depicted, this is the interval of time between a call to the web page for E-Commerce described above and the fresh call to the web page by the client computer 3-1 or by the user N-1:

In the interval of time, the process captures when information for particular products P-1 to P-n is displayed via other client computers 3-2 to 3-$m$ or other users N-2 to N-m, particular products P-1 to P-n are placed into the electronic shopping basket or are put on to an electronic wish list or are purchased by other users N-2 to N-m. These events triggered by other users are part of the product interactions whose features are captured by means of the capture unit 9 in the interval of time between the call and the fresh call to the web page by the client computer 3-1 or the user N-1. The database 7 is used to store that such a feature of a product interaction has been captured, which feature of a product interaction has been captured and when it has been captured. In this case too, it is possible to distinguish whether information for a product P-1 to P-n has only been displayed or whether the other user N-2 to N-m has placed the product P-1 to P-n into the electronic shopping basket or has put it on to the electronic wish list or has purchased the product P-1 to P-n. These feature types can then be taken into consideration for the alteration of the priority data of the products P-1 to P-n for the user N-1 or the client computer 3-1.

The features of the interactions for the products are captured continually when other client computers 3-2 to 3-$m$ or other users N-2 to N-m log in and/or call the web page. When the user N-1 or the client computer 3-1 now calls the web page of the server 1 afresh, the priority data originally stored for the products P-1 to P-n when the web page was previously called by this user N-1 or the client computer 3-1 are altered or updated. Analogously to the method described above for producing the priority data after a first interaction by the user N-1, it is in this case also possible to take into consideration such product interactions as relate to similar products P-1 to P-n.

In particular, an interaction intensity, for example the frequency of a particular interaction, is determined from the features of the product interactions on the basis of time. In this case, a smoothing method is used in order to distribute the features of the product interactions, captured at discrete times, over surrounding periods. In particular, averaging can be effected over a defined period, for example over one week, one month or one year. To alter the priority data, the interaction intensity at the time of the earlier interaction of the user N-1 with the product is compared with the interaction intensity at the time of the fresh call to the web page, for example. In regard to this comparison, it is possible for the quotient of the two values to be formed, for example, in order to determine the current priority data for the user N-1.

According to one exemplary embodiment, the frequency with which information for a product P-1 to P-n has been displayed when the web page is called by another client computer 3-2 to 3-$m$ or another user N-2 to N-m is ascertained. Further, the frequencies with which a product has been placed into the shopping basket or put on to a wish list or purchased by another user N-2 to N-m or by other client computers 3-2 to 3-$m$ are ascertained. These frequencies are also part of the features of the product interactions that are captured by means of the capture unit 9 in the interval of time between the call and the fresh call to the web page by the client computer 3-1 or the user N-1. The greater this frequency, the more the value of the priority data is increased. Moreover, the value of the priority data is increased to an even greater extent when a product has been purchased by another user N-2 to N-n in comparison with the case in which the product P-1 to P-n has only been placed into the electronic shopping basket or put on to the electronic wish list or has only been displayed.

According to a further exemplary embodiment, the interval of time between the call and the fresh call to the web page by the client computer 3-1 or by the user N-1 is admittedly considered at most. If this interval of time is longer than a previously defined time interval portion, however, then only captures of features of product interactions in this time interval portion before the fresh call to the web page by the client computer 3-1 or by the user N-1 are taken into consideration. The time interval portion can comprise a period of one week, one month or four months, for example. In this manner, it is possible to take into consideration seasonal variations in the relevance of a product P-1 to P-n.

According to a further exemplary embodiment, the priority data of the products P-1 to P-n are not altered only when the web page has been called afresh by the client computer 3-1 or by the user N-1. Rather, the priority data can also be altered constantly if the features of the product interactions on account of the call to the web page by other users N-2 to N-m have been captured.

Alternatively or additionally, the above-described physical product interactions by other users N-2 to N-m or other user devices 3-2 to 3-$m$ can contribute to the alteration of the priority data. By way of example, the priority data can also be dependent on the frequency in a store. By way of example, this allows a product P-1 to P-n that is currently purchased particularly frequently by other users N-2 to N-m to be provided with a higher priority. In particular, the combination of data from physical and virtual product interactions can improve the accuracy of the relevance determination.

According to a further exemplary embodiment, it is also possible for current profit margins or availabilities of the product P-1 to P-n to be stored for the products P-1 to P-n in the database 7. The priority data of a product P-1 to P-n can then be additionally raised for a high profit margin or lowered for a low profit margin. Further, the priority data can be raised when the product P-1 to P-n is available, and even more so when there is a high stock level for the product P-1 to P-n, or can be lowered when the product P-1 to P-n is unavailable.

The altered priority data are then used to display e.g. a home page, which includes a list containing information for products P-1 to P-n, on the client computer 3-1. The ranking of this information for the products P-1 to P-n is geared in this case to the value of the priority data of the products P-1 to P-n. Products having high values of the priority data are presented at a higher level and/or more prominently than products P-1 to P-n having lower values of the priority data.

Equally, the priority data can also be taken into consideration by the search engine 8. In response to a search query, the latter performs a relevance rating for the relevance of a product P-1 to P-n to the search query. The hits list for the search query is then produced on the basis of this relevance rating and also additionally on the basis of the priority data.

Figure 3:
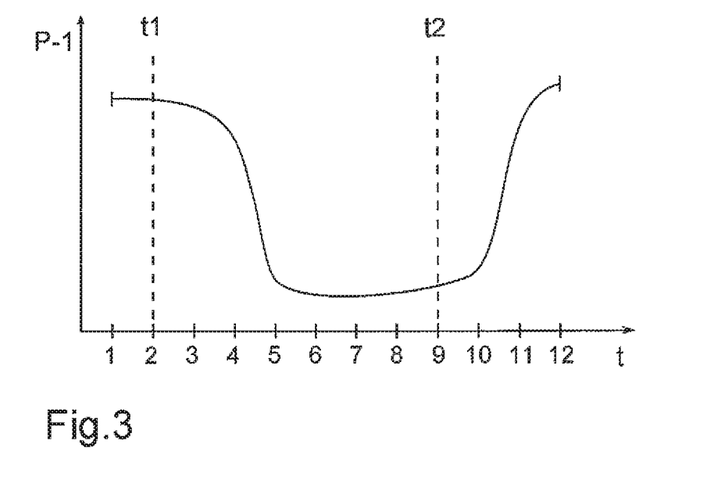
FIG. 3 shows the temporal trend in the frequency of purchase of the product P-1 over a year.
Figure 4:
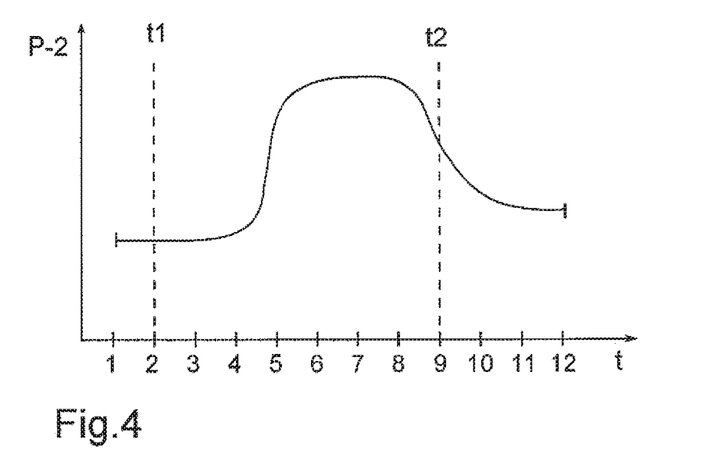
FIG. 4 shows the temporal trend in the frequency of purchase of the product P-2 over a year.

FIGS. 3 and 4 show an example of the trend in the absolute frequency of the purchase of a product P-1 (FIG. 3) and of a product P-2 (FIG. 4) over a year. The numbers depicted on the axis of abscissae denote the months of a year. By way of example, the product P-1 is a winter item, for example a quilted jacket, and the product P-2 is a summer item, such as a swimsuit, for example. It turns out that the product P-1 has been purchased particularly frequently by other users N-2 to N-m in the winter months. By contrast, the product P-2 has been purchased particularly frequently in the summer months.

There follows an explanation of how these sales figures for the products P-1 and P-2 affect the priority data of these products P-1 and P-2 for two successive calls to the web page that offers these products by the user N-1:

By way of example, the user N-1 calls the web page at the time t1 in February and performs a search for different products. He places the products P-1 and P-2 into his shopping basket, but has not purchased these products P-1 and P-2 and leaves the web page again. The database 7 is used to store that this user N-1 has placed the products P-1 and P-2 into the shopping basket at the time t1. Accordingly, the value of the priority data of these products P-1 and P-2 is set to a particular value for this user N-1.

At the time t2 in September, the user N-1 calls the web page afresh. For the alteration of the priority data, a time interval portion of the last three months, i.e. at the period between July and September, is considered in this case. In this period, the product P-1 has been purchased rather rarely by other users N-2 to N-m, whereas the product P-2 has been purchased more frequently. Accordingly, the value of the priority data for the product P-2 is increased to a greater extent than the value of the priority data for the product P-1. Accordingly, information for the product P-2 on the home page of the web page is displayed prominently or with a higher rank in a list containing product information in the event of the fresh call by the user N-1 than the information for the product P-1. During a subsequent search by the user N-1 too, products having higher values for the priority data are assessed as more relevant than products having lower values of the priority data. In this manner, it is taken into consideration that the user N-1 is probably no longer as interested in the product P-1, which is a winter item, of course, when the web page is called afresh in September. However, this rating has been ascertained without the previously stored information about the fact that the product P-1 is a winter item. This allows variations in the relevance of a product over time to be captured on the basis of the user behavior of other users without this information being known in advance.

In a further exemplary embodiment, the interactions depicted in FIGS. 3 and 4 for the products P-1 and P-2 also alter the priority data for other products. By way of example, the product P-1 is supposedly a quilted jacket, and it is thus possible for the system to establish a greater degree of similarity to winter coats than to lightweight summer jackets, for example on the basis of the product category. If the product P-1 is purchased frequently, then as the relevance of P-1 rises the relevance of winter coats can also rise, whereas the less similar lightweight summer jackets are unaffected thereby.

In further exemplary embodiments, the priority data can also be used for other personalization applications. By way of example, such applications include recommendation methods for products P-1 to P-n or methods for selecting products P-1 to P-n that are offered in an individualized message, for example an E-mail advertisement. In these exemplary embodiments, data are stored not for products P-1 to P-n for which information has been output when the web page is called by the client computer 3-1 or by the user N-1, but rather for products for which information has been output on a client computer 3-1 or to a user N-1. In this case, the output can also be effected in another manner, for example via an E-mail, an advertisement or the like.

LIST OF REFERENCE SYMBOLS 1 server
2 Internet
3-1 user device; client computer
3-2 to 3-m other user devices; other client computers
5 control unit
6 graphics unit
7 database
8 search engine
9 capture unit
10 bidirectional interface
N-1 defined user
N-2 to N-m other users
t1, t2 times Having described the invention, the following is claimed:

1. A method for producing priority data in an E-Commerce system for products for which information can be output in connection with E-Commerce, wherein the E-commerce system includes an E-commerce server communicatively couplable via a network to a plurality of user electronic devices, the method comprising:
at a first time, storing, by the E-Commerce server, data for at least one product with which a defined user or a defined user electronic device has interacted,
assigning, by the E-Commerce server, priority data to at least one subset of the products for outputting information for the products to the defined user electronic device on the basis of the stored data,
at a second time, capturing a request by the defined user electronic device for outputting the information for the products, and
outputting on an E-Commerce interface of the defined user electronic device the information for the products in response to the request by the defined user electronic device, the outputting of the information effected on the basis of the assigned priority data, wherein the defined user electronic device obtains from the E-Commerce server the information for the products via the network, wherein
at least in a time interval portion between the first time and second time, the E-Commerce server captures:
features of product interactions that have been generated during an interaction by another user or another user electronic device of the another user with the products of a first subset of the products, and
times at which each of the product interactions takes place, and
the assigned priority data of the first subset of the products are altered by the E-Commerce server on the basis of the respective captured features of the product interactions and the times at which each of the product interactions takes place.

2. The method as claimed in claim 1, wherein the product interactions are physical product interactions and in that the product interactions and/or the features thereof are captured by a capture unit.

3. The method as claimed in claim 1, wherein the E-Commerce server is used to capture a call to a web page by another user electronic device of the another user and, in the process, the features of the product interactions in the time interval portion between the first time and second time are captured.

4. The method as claimed in claim 1, wherein
at the first time data are stored for products for which the product interaction has involved information being output in the event of a call to a web page by the user electronic device of the defined user, the user electronic device comprising a client computer,
the first subset of the products is assigned, on the basis of the stored data, the priority data for a fresh call to the web page by the user electronic device,
at the second time, the request for the information output is a fresh call to the web page by the user electronic device,
the output of information for the products in the event of the fresh call to the web page is effected on the basis of the assigned priority data, and
the first time is the call and the second time is the fresh call to the web page by the user electronic device.

5. The method as claimed in claim 1, wherein the product interactions and/or the features thereof are captured by means of a sensor.

6. The method as claimed in claim 1, wherein the product interactions involve capturing a physical proximity between the products and the defined user and/or the defined user electronic device.

7. The method as claimed in claim 6, wherein the features of the product interactions are dependent on the captured physical proximity between the products and the defined user and/or the defined user electronic device.

8. The method as claimed in claim 1, wherein a camera system or a set of data goggles of the defined user is used to capture the physical position of the defined user relative to the physical position of the products, and the features of the product interactions are dependent on the captured relative position of the defined user in relation to the products.

9. The method as claimed in claim 1, wherein the method further comprises capturing a corporal interaction of the defined user with the products, the features of the product interactions being dependent on the captured corporal interaction of the defined user with one of the products.

10. The method as claimed in claim 1, wherein the method further comprises capturing a code of one of the products by use of an electronic checkout system, the features of the product interactions being dependent on the captured code of one of the products.

11. The method as claimed in claim 1, wherein the product interactions involve signals being transmitted between the products and the defined user electronic device by means of at least one transponder.

12. The method as claimed in claim 1, wherein the features of the product interactions for the products comprise frequency of the interaction with these products by the another user electronic device.

13. The method as claimed in claim 1, wherein the features of the product interactions for the products comprise frequency of a purchase process for these products in the event of interactions by the another user or the another user electronic device.

14. The method as claimed in claim 1, wherein the method further comprises ranking of the output of information for the products immediately after the request for an output of information by the defined user electronic device, said ranking dependent on the assigned priority data for the products.

15. The method as claimed in claim 1, wherein the method further comprises:
receiving a search query for searching for products,
performing a relevance rating in regard to the relevance of the respective product to the search query for the product data stored for the products, and
producing a hits list for the products for the output of the information for at least one second subset of the products, in the case of which hits list the ranking of the products is dependent on the relevance rating and on the priority data.

16. The method as claimed in claim 1, wherein
a measure of similarity for the products is determined for the at least one product, and
the priority data of the first subset of the products are further produced or altered on the basis of the measure of similarity for the products with which a user or a user electronic device has interacted.

17. A method for operating a web page for E-Commerce in connection with an E-commerce system that includes an E-Commerce server communicatively couplable via a network to a plurality of user electronic devices, comprising:
capturing an interaction with at least one product by a defined user or a defined user electronic device of the user,
storing, by an E-Commerce Server, data for the product with which an interaction has been captured,
producing priority data for at least one first subset of the products in accordance with the following steps:
at a first time, storing, by the E-Commerce server, data for at least one product with which the defined user or the defined user electronic device has interacted,
assigning, by the E-Commerce server, the priority data to the at least one subset of the products for outputting information for the products to the defined user electronic device on the basis of the stored data,
at a second time, capturing a request by the defined user electronic device for outputting the information for the products,
wherein
at least in a time interval portion between the first time and second time:
features of product interactions are captured that have been generated during an interaction by another user or another user electronic device of the another user with the products of the first subset of the products, and
times at which each of the product interactions takes place are captured, and
the assigned priority data of the first subset of the products are altered by the E-Commerce server on the basis of the respective captured features of the product interactions and the times at which each of the product interactions takes place,
capturing by the E-Commerce server a call to the web page by the user electronic device, and
outputting on an E-Commerce interface of the user electronic device the information for the products on the basis of the assigned priority data, wherein the user electronic device obtains from the E-Commerce server the information for the products via the network.

18. The method as claimed in claim 17, wherein the interaction with the at least one product is a call to the web page that involves information being output for the product.

19. The method as claimed in claim 17, wherein the call to the web page involves a client computer identification being transmitted, the transmitted client computer identification being used to determine whether the web page has been called by the client computer or another client computer.

20. The method as claimed in claim 17, wherein the call to the web page involves a user identification being performed and the user identification is used to determine whether the web page has been called by the defined user or another user.

21. A non-transitory computer readable medium storing program code for producing priority data for products for which information can be output in connection with an E-Commerce system that includes an E-Commerce server communicatively couplable via a network to a plurality of user electronic devices, wherein when executed by a computer, the program code causes the computer to:
at a first time, storing data for at least one product with which a defined user or a defined user electronic device has interacted,
assigning priority data to at least one subset of the products for outputting information for the products to the defined user electronic device on the basis of the stored data,
at a second time, capturing a request by the defined user electronic device for outputting the information for the products to the defined user electronic device, and
outputting on an E-Commerce interface of the defined user electronic device the information for the products in response to the request by the defined user electronic device, the outputting of the information effected on the basis of the assigned priority data, wherein the defined user electronic device obtains from the E-Commerce server the information for the products via the network,
wherein
at least in a time interval portion between the first time and second time,
features of product interactions are captured that have been generated during an interaction by another user or another user electronic device of the another user with the products of a first subset of the products, and
times at which each of the product interactions takes place are captured, and
the assigned priority data of the first subset of the products are altered on the basis of the respective captured features of the product interactions and the times at which each of the product interactions takes place.

22. The method as claimed in claim 1, said assigning priority data performed without consideration of interaction with the at least one subset of products by another user or another user electronic device.

* * * * *